United States Patent [19]
Downey

[11] Patent Number: 5,522,635
[45] Date of Patent: Jun. 4, 1996

[54] TONNEAU COVER AND FRAME FOR PICK-UP TRUCKS

[76] Inventor: Darrin Downey, 4833 Heffield Cir., Syracuse, N.Y. 13215

[21] Appl. No.: 435,198

[22] Filed: May 5, 1995

Related U.S. Application Data

[63] Continuation of Ser. No. 188,080, Jan. 28, 1994, abandoned.
[51] Int. Cl.$^6$ .................................................... B60P 7/04
[52] U.S. Cl. ........................ 296/100; 411/339; 411/512; 24/662; 160/368.1; 160/383
[58] Field of Search .................. 296/100; 160/327, 160/354, 368.1, 383, 395, 399, 402; 248/231.6; 24/587, 683, 686, 662, 691, 621; 411/338, 339, 512

[56] References Cited

U.S. PATENT DOCUMENTS

| | | | |
|---|---|---|---|
| 2,946,612 | 7/1960 | Ahlgren | 24/662 |
| 3,213,507 | 10/1965 | Christian et al. | 24/662 |
| 3,734,551 | 5/1973 | Hughes et al. | 24/662 |
| 4,838,602 | 6/1989 | Nett | 296/100 |
| 5,007,146 | 4/1991 | Meidan | 24/683 |
| 5,207,262 | 5/1993 | Rushford | 160/368.1 X |

*Primary Examiner*—Dennis H. Pedder
*Attorney, Agent, or Firm*—Charles S. McGuire

[57] ABSTRACT

Apparatus for removably attaching a tonneau cover to a pick-up truck bed comprises a rectangular framework formed of four individual, elongated frame members each having a longitudinally extending channel formed therein. An elongated, plastic extrusion having first and second, longitudinally extending, resilient, spaced walls is slidingly inserted within each of the channels in the frame members. A plurality of male fastening elements each having a rigid, rectangular snap portion with a trapezoidal-shaped terminal end are fixed in spaced relation to the peripheral edges of the cover. A lip is formed about each snap portion which engages first and second flanges formed on the first and second walls of the extrusion upon pressing the snap portion of a fastener in the extrusion channel formed between the first and second walls thereof.

3 Claims, 5 Drawing Sheets

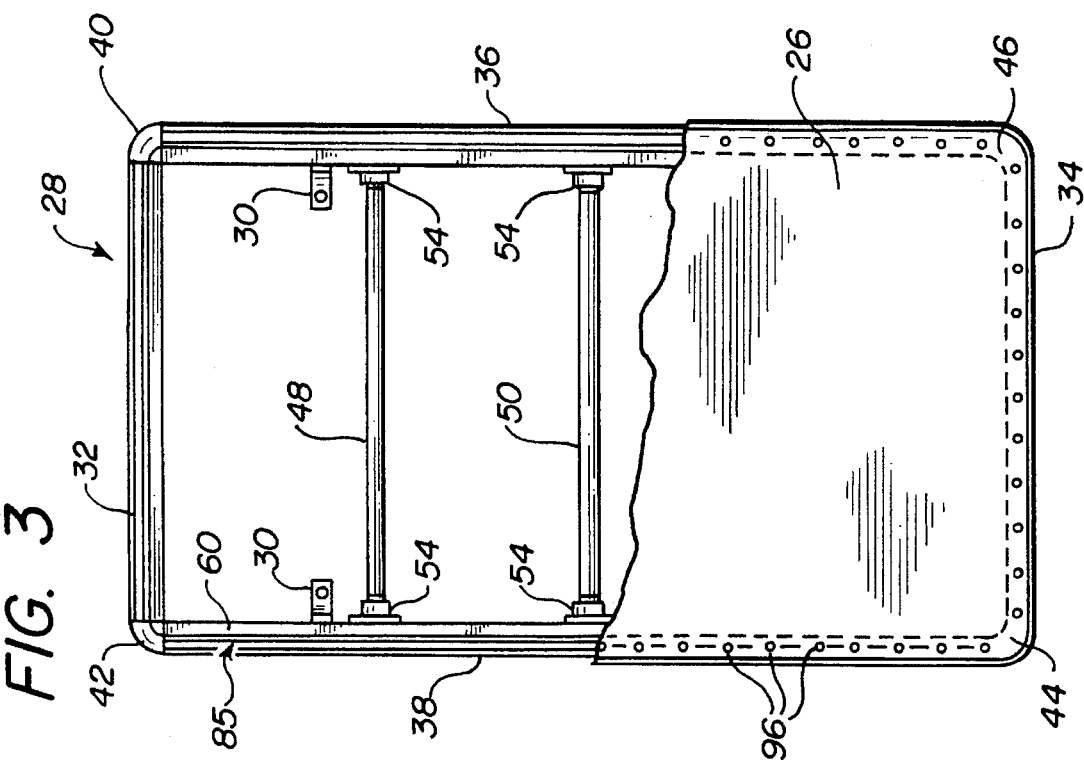
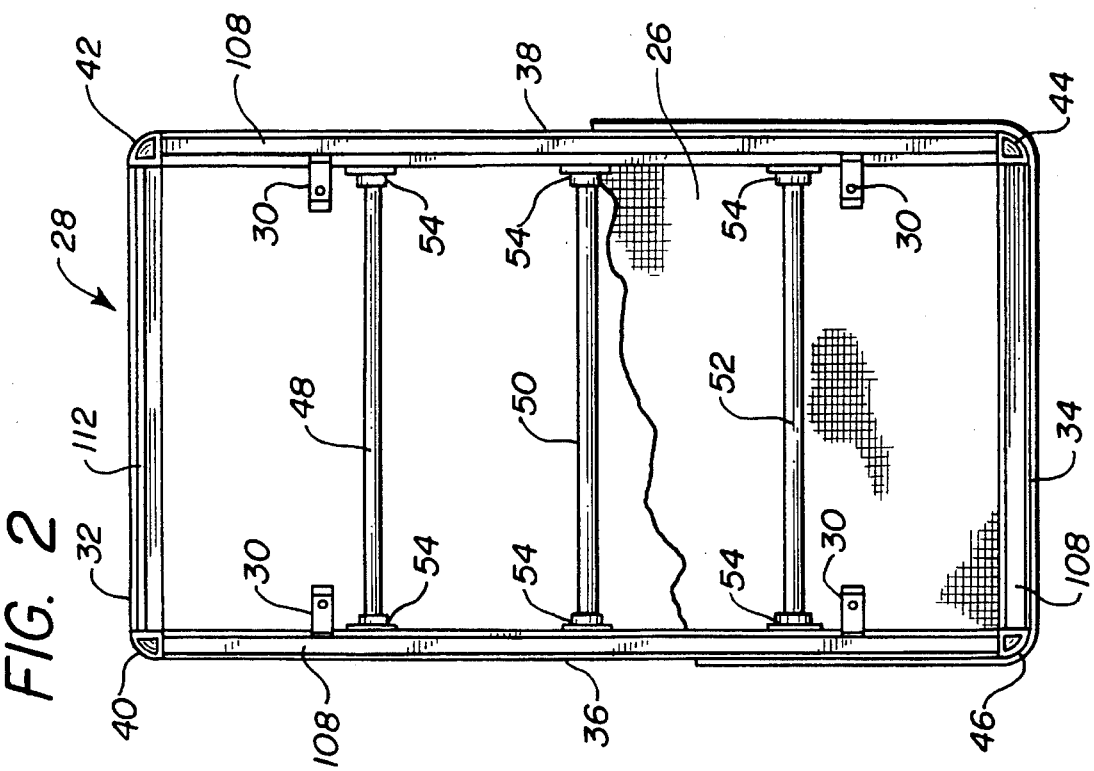

5,522,635

TONNEAU COVER AND FRAME FOR PICK-UP TRUCKS

REFERENCE TO RELATED APPLICATION

This is a continuation of application 08/188,080, filed Jan. 28, 1994, now abandoned.

BACKGROUND OF THE INVENTION

The present invention relates to pick-up truck cargo box covers (typically termed "tonneau covers" in the art), and more particularly to a tonneau cover and frame for removably attaching to the top perimeter of a pick-up truck cargo box.

Removable pick-up truck tonneau covers have been in existence for many years and generally comprise a flexible cover having male or female snap fasteners spaced about the peripheral edges thereof. Mating snap fasteners are usually mounted directly to the top, outer perimeter of the truck cargo box, or to a framework which is clamped to the top edge of the truck bed. The snap fasteners on the truck and cover must be in precise alignment to secure the cover to the truck bed, however, the flexible nature of the tonneau cover is subject to shrinkage and/or stretching over its surface by the elements such as sun, rain, snow, etc. This has been known to cause the male and female snap fasteners to go out of alignment thereby preventing proper securement of the tonneau cover to the truck bed. Various tonneau cover and truck bed frame fastening element designs have been developed in an effort to provide a tonneau cover and mounting frame which accommodates the changes in tonneau cover size due to uneven shrinking and stretching.

For example, U.S. Pat. No. 4,838,602 which issued to Nett on Jun. 13, 1989 discloses a tonneau cover frame having a longitudinally extending channel 38. A snap base 76 is pop riveted to a snap fastener glide 78 which is slidingly received in the channel 38. The top button 80 is fixedly secured to the peripheral edge of the tonneau cover with a snap fastener glide being slid along the frame channel to bring it into alignment with a respective cover top button which may then be releasably secured together.

U.S. Pat. No. 5,121,960, issued to Wheatly on Jun. 16, 1992 discloses three alternate structures and methods for releasably securing the tonneau cover to the frame. In two of the embodiments (FIGS. 4 and 12), a J-shaped, flexible fastener which resiliently engages the lip of the specialized frame is shown. In the other embodiment (FIGS. 8 and 9), a conventional male snap fastener 204 is fixed to a slider element 220 which rides along a track formed in the frame. Conventional female snap fasteners 202 which are provided in spaced relation along the peripheral edge of a tonneau cover are positioned over a respective one of the male fastener elements on the frame. Each male fastener element may be slid along the frame to bring it into alignment with a respective female fastener to be releasably secured to one another.

Lastly, U.S. Pat. No. 5,152,574, issued to Tucker on Oct. 6, 1992 discloses snap fastener "clips" carrying a male fastener element which are snapped on and off a track formed in the rail member. The clips may thus be repeatedly pried off and then repositioned on the rail member to bring it into alignment with a respective female fastening element on the cover.

In each of the above patents, the male fastening elements are subject to unintentional release from the rail whereupon they may be lost or misplaced. Furthermore, the male and female fastening elements must be repeatedly re-aligned by moving the individual male fastening elements along the rail which is necessarily a time-consuming task.

SUMMARY OF THE INVENTION

It is therefore a principal object of the present invention to provide a pick-up truck tonneau cover and frame assembly wherein the frame includes a snap-receiving channel extending substantially the full perimeter thereof thereby eliminating the need for alignment between cover and frame fastening elements.

It is a further object of the present invention to provide a pick-up truck cargo box tonneau cover and frame assembly of the above type in which the snap-receiving channel is configured to securely yet releasably hold the male snap fasteners located in spaced relation about the peripheral edges of the tonneau cover.

It is another object of the present invention to provide a pick-up truck bed tonneau cover and frame assembly of the above type which is comprised of a minimum of parts to reduce the chance and amount of parts accidentally becoming loose and separating from the cover and/or frame assembly.

It is yet a further object of the present invention to provide a tonneau cover and frame assembly of the above type wherein the frame assembly is extremely quick and easy to install and remove from a pick-up truck cargo box.

It is still a further object of the present invention to provide a tonneau cover and frame assembly for a pick-up truck cargo box of the above type wherein the cooperative fastening elements of the cover and frame assembly permit very quick and simple, releasable attachment of the cover to the frame, while also providing extremely secure attachment thereof.

Other objects will in part be obvious and in part appear hereinafter.

In accordance with the foregoing objects, the invention comprises a flexible tonneau cover and frame assembly for removably attaching to an open pick-up truck cargo box. The frame assembly comprises four individual, linear members of extruded aluminum attached together with corner pieces at their ends to form a rectangular framework. The framework is placed and clamped in matching, covering relation over the top edges forming the rectangular perimeter of the vehicle cargo box, including the tailgate. Each linear member of the framework is configured with a planar bottom wall which is placed in covering contact with a respective top, horizontally oriented surface of the vehicle cargo box perimeter. Each frame member further includes a vertically extending sidewall extending perpendicularly from the bottom wall, a top wall extending approximately perpendicularly from the side wall and parallel to the bottom wall, and a channel formed opposite the side wall and between the top and bottom walls which is angularly oriented at approximately 45° thereto. The channel extends the full longitudinal length of each frame member which is positioned on the cargo box perimeter with each frame member side wall facing towards the center of the cargo box and the channel facing outwardly. As such, the channels extend about substantially the full perimeter of the cargo box and are readily accessible to a person standing exteriorly of, yet adjacent to, the vehicle cargo box.

The channel in the frame member is configured to slidingly receive an elongated, resilient, plastic extrusion which extends the full length of the frame member channel and is secured therein by the frame corner pieces. The plastic extrusion includes an elongated, planar bottom surface having opposite, parallel side edges with first and second, spaced and parallel side walls extending perpendicularly therefrom, with said first and second side walls completely traversing the bottom surface parallel to and spaced inwardly of the opposite side edges thereof. The top edges of the side walls located opposite the bottom surface bend downwardly toward the longitudinal center of the bottom surface to form first and second flanges which, together with the first and second side walls and bottom surface, form a second, longitudinally extending, snap-receiving channel.

A plurality of male snap fasteners of a unique square configuration are fixed in spaced relation about the peripheral edges of a flexible tonneau cover. Each male fastener comprises a circular head portion which is attached to a square base portion located on the opposite surface of the cover. The square base portion includes a trapezoidal-shaped terminal portion which provides a lip at the juncture of the base and terminal portions. Upon pressing a male fastener into the channel of the plastic extrusion between the first and second side walls thereof, opposite sides of the lip of the fastener engage the first and second flanges of the first and second plastic extrusion side walls, respectively. The resiliency of the plastic extrusion and the rigidity of the male fasteners provide a secure snap-fit of the fasteners within the extrusion channel, yet permit easy removal thereof upon forcibly pulling the fastener from the channel.

The plastic extrusion thus provides a continuous snap-receiving channel whereby the male fastening elements on the tonneau cover may be secured therein at any point along the full length of the channel. As such, the need for alignment between individual male and female fastening elements on the tonneau cover and frame, respectively, is eliminated.

BRIEF DESCRIPTION OF THE DRAWINGS

FIGS. 2 and 3 are bottom and top plan views of the frame with tonneau cover (fragmented) attached thereto, respectively;

DETAILED DESCRIPTION

Figure 1:
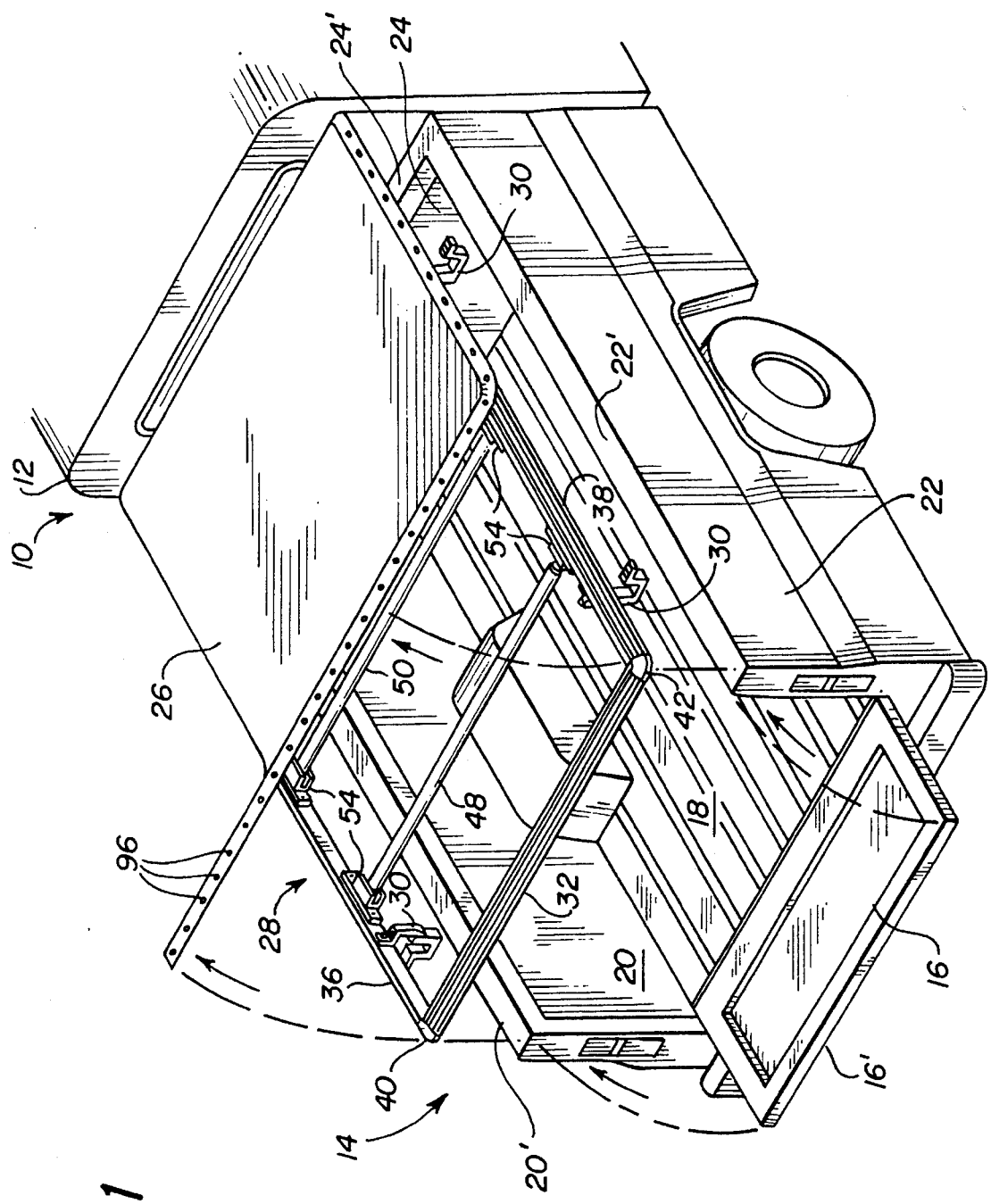
FIG. 1 is a perspective view of a pick-up truck (fragmented) with the inventive frame and tonneau cover shown spaced above the cargo box thereof, the rear half of the tonneau cover shown lifted from the frame and the vehicle's tailgate shown in the lowered position.
Figure 4:
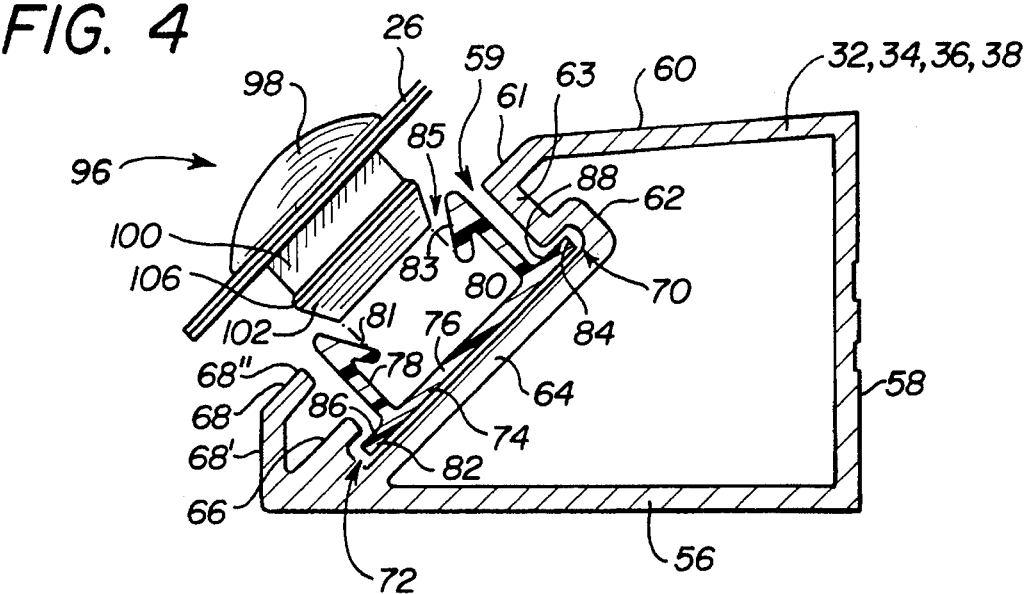
FIG. 4 is a cross-sectional view of one of the linear frame members including the plastic extrusion positioned inside the longitudinal channel of the frame member, and a male fastening element spaced above the snap-receiving channel of the plastic extrusion.
Figure 6:
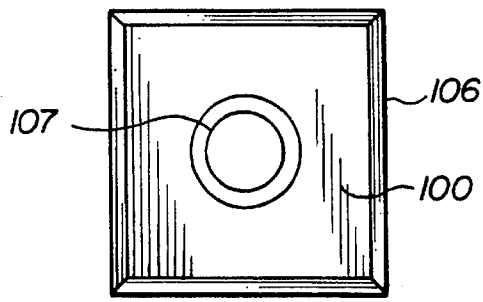
FIG. 6 is a cross-sectional view of the male fastening element as taken along the line 6—6 in FIG. 5.
Figure 7:
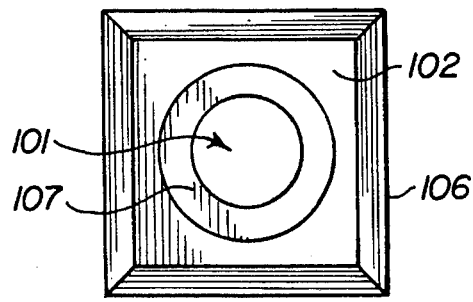
FIG. 7 is a plan view of the trapezoidal-shaped terminal portion of the male fastening element located opposite the circular head portion thereof.
Figure 5:
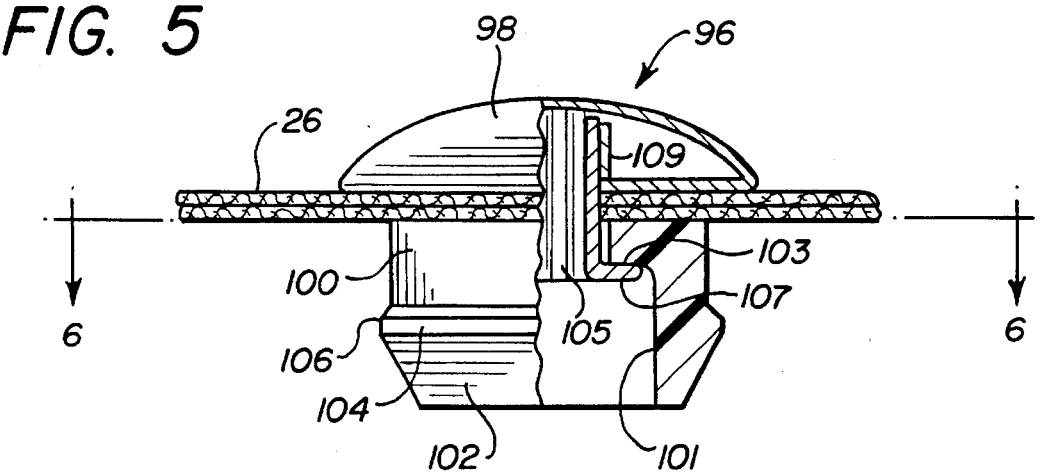
FIG. 5 is a side, elevational view, partly in cross-section, of a male fastening element attached to a tonneau cover (fragmented)

Referring now to the drawings, there is seen in FIG. 1 a pick-up truck 10 (fragmented) having a front cab 12 and rear, open cargo box 14 having a tailgate 16 movable between open and closed positions. Cargo box 14 is conventional and includes a floor 18 with opposite, parallel side walls 20 and 22, and a front wall 24 located adjacent cab 12 opposite tailgate 16. Side walls 20 and 22 and front wall 24 include a horizontal top surface 20', 22' and 24', respectively, forming a rectangular, top perimeter of the cargo box 14 together with the top surface 16' of tailgate 16 when in the closed position. The top perimeter of cargo box 14 extends inwardly past side walls 20, 22 and 24 such that a lip is formed therewith.

Flexible tonneau cover 26 is provided which is of rectangular outline with rounded corners and having length and width dimensions substantially equal to the length and width dimensions of cargo box 14. As such, cover 26 completely covers cargo box 14 when attached thereto in the manner described below. Generally speaking, cover 26 is removably attachable to a rectangular framework 28 which itself is removably mounted in covering relation to the top perimeter of cargo box 14 via clamps 30. During normal usage, it is intended that framework 28 remain attached to cargo box 14 while tonneau cover 26 is alternately removed and attached to framework 28 as desired.

Referring still to FIG. 1, and now also to FIGS. 2 and 3, framework 28 is seen to comprise four individual, elongated members 32, 34, 36 and 38 which are interconnected to each other at their ends via quarter-round corner pieces 40, 42, 44 and 46 to form a rectangular framework. Three elongated, tubular support rods 48, 50 and 52 are removably attached in laterally extending, longitudinally spaced arrangement to frame members 36 and 38 via mounted bracket pieces 54. Support rods 48, 50 and 52 are conventional in that they are found in most tonneau cover frame assemblies of today, and act to support and maintain cover 26 in a substantially planar configuration when attached to framework 28 in the intended manner.

Referring specifically to FIG. 1, it is seen that framework 28 is of a length and width substantially equal to the length and width of cargo box 14 whereby frame members 32, 34, 36 and 38 may be placed in contacting, covering relation over perimeter top surfaces 16', 24', 20' and 22', respectively, of cargo box 14. Clamps 30 are used to secure side frame members 36 and 38 to cargo box side walls 20 and 22, respectively, with two such clamps 30 attached to each side of the framework and cargo box generally being adequate (FIG. 2). The manner of attaching clamps 30 to secure the frame members to the cargo box top perimeter will be described later.

Tailgate 16 may be raised and lowered independently of framework member 32, however, when it is desired to remove cover 26, support bars 48, 50 and 52 in addition to framework member 32 may be removed from the remainder of framework 28 to provide maximum access to the interior of cargo box 14. This is easily accomplished by removing rear corner pieces 40 and 42, and sliding the ends of support rods 48, 50 and 52 from between the spaced, parallel walls of bracket pieces 54.

Attention is now turned to FIGS. 4–10 which show the individual framework pieces and tonneau cover snap fastener in greater detail. Each frame member 32, 34, 36 and 38 is formed of extruded aluminum and includes a planar bottom wall 56, a side wall 58 which extends substantially perpendicular to bottom wall 56, and a top wall 60 which slopes slightly downwardly in a direction away from side wall 58. A channel 59, which extends the full longitudinal lengths of each frame member 32, 34, 36 and 38, is formed opposite side wall 58 in the following manner. The edge of top wall 60 located opposite side wall 58 bends inwardly several times to form channel top and side walls 61 and 63, respectively, and lip 62 with channel bottom wall 64 which itself extends at an approximately 45° angle from the edge of frame bottom wall 56 located opposite side wall 58. Inner and outer flanges 66 and 68, respectively, are formed at the outer juncture of frame bottom wall 56 and channel bottom wall 64, and extend in a direction toward top wall 60 and parallel to channel bottom wall 64. Channel side wall 63 extends substantially perpendicular to channel bottom wall 64 with lip 62 and inner flange 66 forming first and second channel grooves 70 and 72, respectively, with channel bottom wall 64.

It is further seen that outer flange 68 includes a vertical section 68' which lies parallel to frame side wall 58, with the terminal end portion 68" thereof lying in a plane spaced and parallel to inner flange 66, and spaced and coplanar with channel top wall 61. The tips of inner and outer flanges 66 and 68 also lie in a plane parallel to channel side wall 63 for reasons explained below.

Four elongated, plastic extrusions 74 are provided which are preferably formed of a polycarbonate which provides enhanced impact strength and resiliency. Each extrusion is slidingly received in the channel 59 of a respective frame member 32, 34, 36 and 38 as described below. The length of each extrusion 74 is substantially equal to its respective frame member such that each extrusion 74 extends within the full longitudinal length of its respective frame member channel 59. Each extrusion 74 includes a planar bottom wall 76 with first and second, spaced and parallel walls 78 and 80 which extend perpendicularly upwardly therefrom. Extrusion walls 78 and 80 longitudinally traverse the entire length of extrusion 74 parallel to, yet spaced equally inwardly from the opposite, parallel, side edges 82 and 84 of extrusion bottom wall 76. The top portions of extrusion walls 78 and 80 are further seen to bend downwardly toward the longitudinal center of frame channel 59 forming first and second extrusion flanges 81 and 83, respectively. Extrusion walls 78 and 80, together with extrusion bottom wall 76, form a continuous snap-receiving channel 85 which extends the full longitudinal length of extrusion 74.

Figure 8:
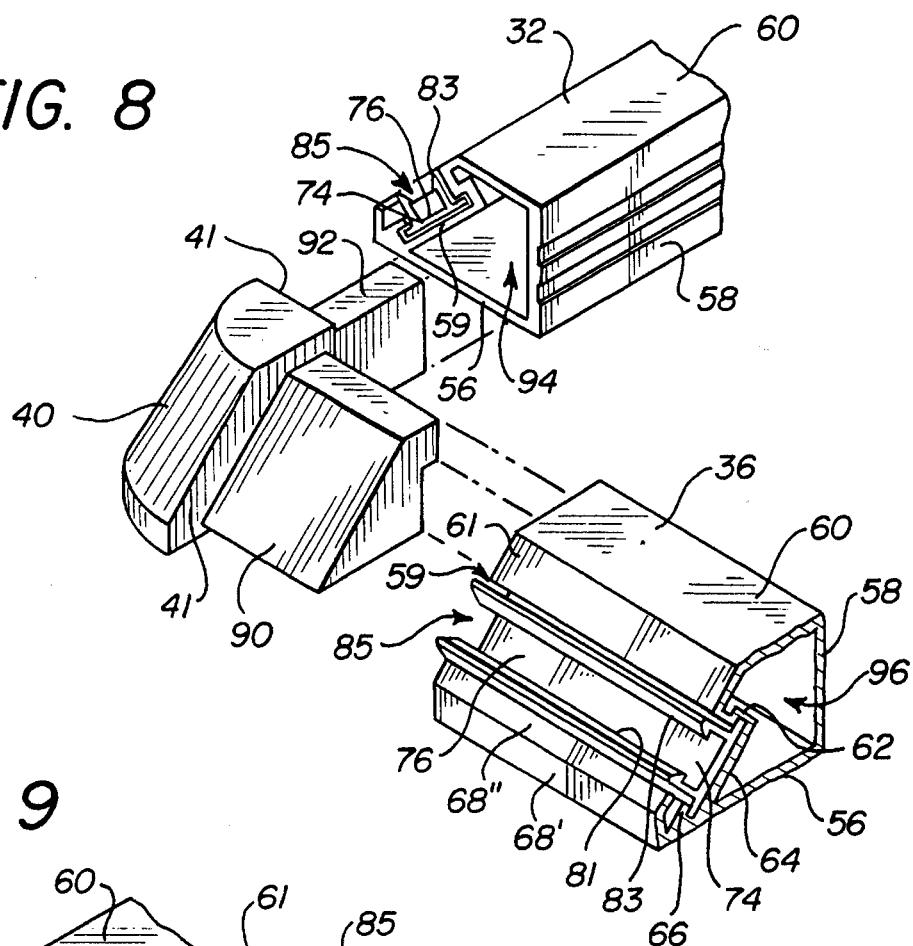
FIG. 8 is a perspective view of the ends of two of the frame members (fragmented) shown spaced from a frame corner piece.

The portions of extrusion bottom wall 76 located outwardly of extrusion walls 78 and 80 form first and second, longitudinally extending shoulder segments 86 and 88 which are slidingly received into first and second channel grooves 70 and 72, respectively, upon inserting extrusion 74 into frame channel 59 at either open end of the frame member. After each extrusion 74 is slidingly inserted within the channel 59 of a respective frame member 32, 34, 36, 38, the ends of the frame members are joined together in the manner shown with corner pieces 40, 42, 44, 46 to form the rectangular framework seen in FIG. 1–3. FIG. 8 shows a corner piece 40 joining the ends of frame members 32 and 36 together. As seen, extrusion 74 has been previously inserted within a respective channel 59, with extrusion shoulder segments 86 and 88 inserted within frame grooves 70 and 72, respectively, as described above.

Each corner piece 40 includes molded projections 90 and 92 which extend perpendicular to each other and include an outline permitting the secure, friction-fit engagement thereof with the inside surfaces of the open center passageway 94 and 96 of frame members 32 and 36, respectively, when inserted therein. Upon full insertion of projections 90 and 92 into frame member passageways 94 and 96, the vertical wall portion 41 on either side of the main body portion (FIG. 8) firmly abuts the end of the frame member. Corner pieces 40 thus act as stops to prevent any substantial longitudinal movement of extrusion 74 within its respective frame member. It will be further noticed in FIGS. 1–3 that the main body portion of each corner piece 40, 42, 44, 46 located between the molded projections (which are hidden in these Figures) has a radius which is flush with the outer edges of its respective frame members when attached thereto such that smoothly rounded corners are provided on framework 28.

FIGS. 4–7 show the male snap fastener 96, a plurality of which are attached in spaced relation about the peripheral edges of tonneau cover 26 as seen in FIGS. 1 and 3. Snap fastener 96 includes a circular head portion 98 which is pop riveted to a square snap portion 100 located on the opposite side of tonneau cover 26. Snap portion 100 includes a trapezoidal shaped terminal portion 102 integrally formed therewith. A bore 101 having a shoulder 103 extends entirely through snap portion 100 and terminal portion 102. A cylindrical metal fastener 105 having a terminal, circular flange 107 is fixedly secured in concentric relation to the inside surface of a cylindrical wall 109 provided in the center of head portion 98. Fastener 105 extends from head portion 98 with the terminal, circular flange 107 engaging the shoulder portion 103 thereby securing head portion 98 to snap portion 100 on either side of cover 26.

It will be noticed that the cross dimensions of the base 104 of the trapezoidal shaped terminal portion 102 are larger than the cross dimensions of snap portion 100 such that a lip 106 is formed at the juncture thereof. Snap portion 100 together with terminal portion 102 are preferably formed of DELRIN® 500, a plastic composition produced by DuPont which is very rigid and highly durable against heat, erosion and impact.

Referring again to FIG. 4, it is seen that snap fastener 96 may be removably attached to a frame member by forcibly pressing the snap portion comprising base and terminal portions 100 and 102, respectively, into the snap-receiving channel 85 of extrusion 74. Since at least extrusion walls 78 and 80 are resilient as described above, as the snap fastener is pressed into channel 85, opposite surfaces of terminal portion 102 press against flanges 81 and 83 thereby forcing extrusion walls 78 and 80 apart a distance sufficient to pass the base 104 of terminal portion 102 past flanges 81 and 83. Once base 104 has past flanges 81 and 83, the resiliency of extrusion 74 biases extrusion walls 78 and 80 together whereby opposite sides of fastener lip 106 become engaged beneath flanges 81 and 83. As such, fastener 96 is secured within extrusion channel 85 until forcibly pried therefrom. Due to the high impact strength of the polycarbonate material from which extrusion 74 is made, snap fastener 96 may be repeatedly attached and removed from between extrusion walls 78 and 80 without diminishing the resilient strength thereof.

The width of extrusion bottom wall 76 is slightly less than the width of frame channel 59 as measured at grooves 70 and 72 such that extrusion 74 may move freely a limited amount back and forth in a lateral direction within channel 59 while still being securely retained therein. The provision of a predetermined amount of lateral play of extrusion 74 within frame channel 59 results in extrusion walls 78 and 80 firmly abutting frame flanges 66 and 68, and channel wall 63, respectively, when extrusion 74 is moved to either side of frame channel 59. This occurs, for example, when tonneau cover 26 is completely attached to frame assembly 28 and the vehicle is travelling at a speed sufficient to cause the tonneau cover 26 to bellow due to air currents entering the cargo box 14. Since tonneau cover 26 is substantially the same dimensions as frame assembly 28, tonneau cover 26 bellows only slightly, yet the forces thereon created by the air currents urge the snap fasteners 96 in a direction toward the center of cargo box 14. This causes extrusions 74 to move laterally within frame channel 59 toward channel wall 63. As such, extrusion wall 80 firmly abuts channel wall 63 which acts to reinforce extrusion wall 80 thereby substantially preventing accidental release of snap fastener 96 from extrusion channel 85 when travelling at increased speeds.

Figure 9:
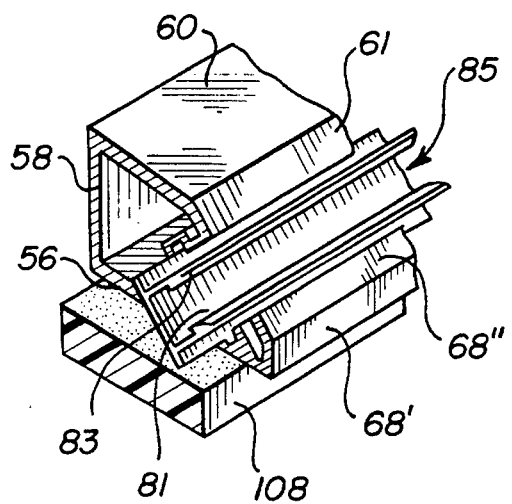
FIG. 9 is a fragmented, perspective view of a linear frame member with plastic extrusion attached thereto including the cushioning strip attached to the bottom surface of the linear frame member.
Figure 10:
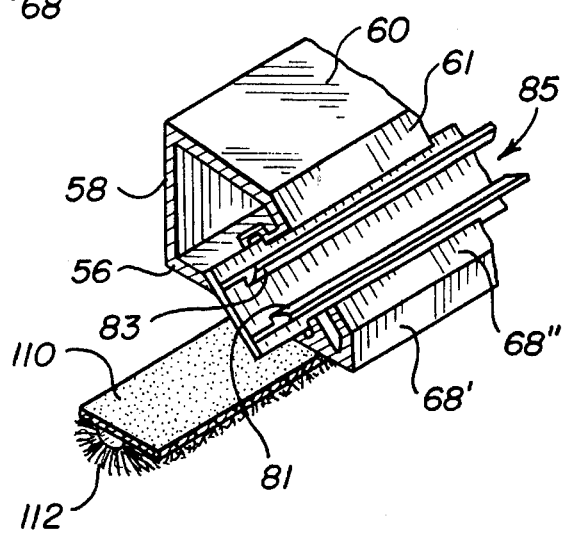
FIG. 10 is the view of FIG. 9 showing the tailgate cushioning strip attached to the bottom surface of the linear frame member.

Prior to mounting framework 28 to cargo box 14, a cushioning strip 108 is adhesively affixed to the bottom wall 56 of side frame members 36 and 38 and forward frame member 34 (FIGS. 2 and 9). Cushioning strip 10, sometimes referred to as "cap tape" in the art, has been used for many years to provide a cushioned barrier between the facing metal surfaces of a tonneau cover framework or pick-up truck cap, and the cargo box perimeter to which the framework or cap is mounted. Rear frame member 32 is preferably provided with a cushioning strip having opposite adhesive and pile surfaces 110 and 112, respectively, with pile surface 112 contacting the top surface 16 of tailgate 16 when in the closed position.

Figure 12:
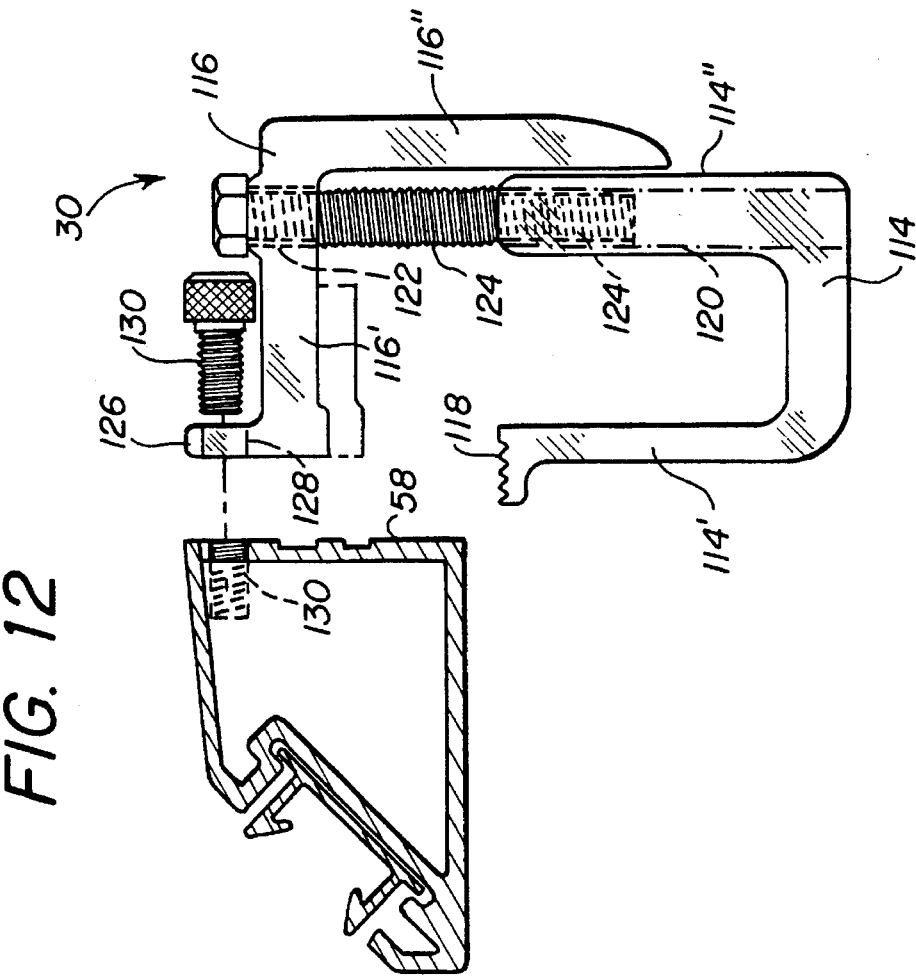
FIG. 12 is a side, elevational view thereof, and further including a cross-sectional view of a frame member shown in spaced relation thereto and showing the manner of attaching the clamp to the frame member.
Figure 11:
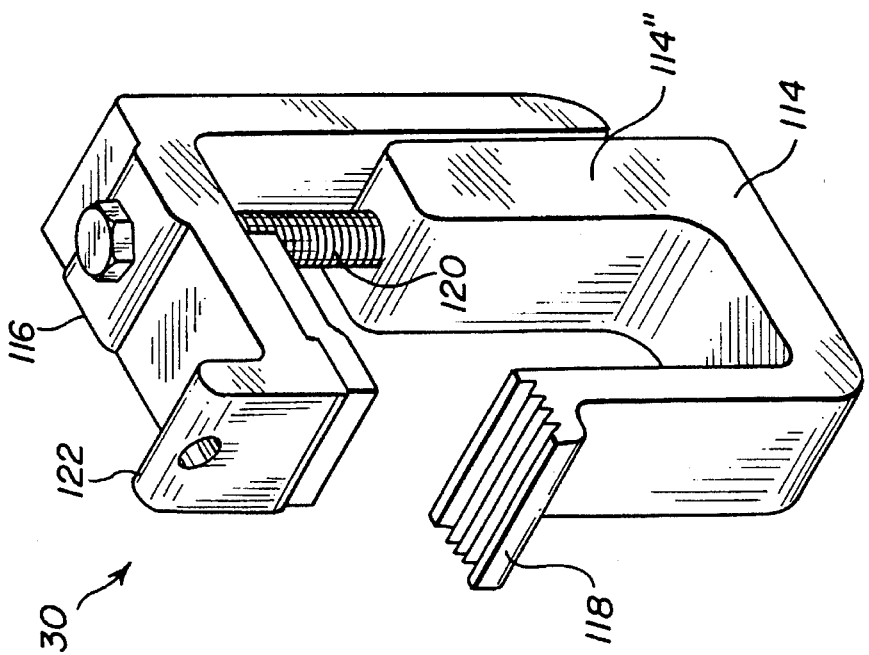
FIG. 11 is a perspective view of the clamp assembly used to secure the frame assembly to the top perimeter of the vehicle cargo box.

Referring lastly to FIGS. 11 and 12, clamp 30 is seen to comprise first and second clamping portions 114 and 116, respectively, with first, U-shaped clamping portion 114 having a serrated lip 118 at the end of the first leg 114' thereof, and a first threaded bore 120 concentrically extending entirely through the second leg 114" thereof. Second clamping portion 116 is of generally L-shaped configuration including first and second, perpendicularly extending, legs 116' and 116", respectively. A second, non-threaded bore 122 is formed laterally and entirely through the first leg 116' of second clamping portion 116, with a threaded bolt 124 passing through the first and second, aligned bores 120 and 122 with the second leg 116" of second clamping portion 116 extending outwardly adjacent and parallel to the second leg 114" of first clamping portion 114. In this way, the vertical spacing between first and second clamping portions 114 and 116 may be enlarged or reduced by turning bolt 124 in either direction.

It is seen that a vertically extending lip 126 is formed at the end of the first leg 116' of second clamping portion 116, with a third, non-threaded bore 128 being formed laterally and entirely therethrough. An elongated, threaded nut 130 is tapped into the side wall 58 of the frame member where it is desired to place a clamp 30. The second clamping portion 116 of clamp 30 is directly attached to the frame member by aligning bore hole 128 in lip 126 with the nut 130 in frame side wall 58 and passing a threaded bolt 132 therethrough. Thus, to clamp the frame member to the cargo box top perimeter, serrated lip 118 of first clamping member 114 is positioned beneath the top perimeter of the cargo box and bolt 124 is turned to reduce the vertical spacing between first and second clamping portions 114 and 116, respectively. As this is done, second clamping portion 116 forces frame member side wall 58 downwardly with first clamping portion 114 providing an upward force against the bottom of the cargo box top perimeter thereby firmly securing the frame member to the cargo box top perimeter. Since second clamping portion 116 is directly attached to the frame member, the possibility of unintentional release of clamp 30 therefrom is substantially reduced.

While the foregoing description is related to the preferred embodiment of the invention, it will be appreciated to those skilled in the art that various modifications may be made thereto without departing from the full spirit and scope of the invention as defined by the claims which follow.

What is claimed is:

1. Apparatus for removably attaching a flexible cover to a cargo box having a horizontal, linear upper edge, said apparatus comprising:

a) at least one elongated frame member having a substantially uniform cross section throughout its length and formed from a substantially rigid material;

b) first wall means forming an integral part of said frame member and defining a first channel closed at the sides and bottom and open at the top and at least one end, said first channel extending along a first, linear axis;

c) means for affixing said frame member to said cargo box with said first axis in parallel relation to said cargo box upper edge;

d) an elongated insert having a substantially uniform cross section throughout its length and formed from a material having limited flexibility with memory characteristics to return to an unflexed position after being forcibly flexed therefrom;

e) second wall means forming an integral part of said insert and defining a second channel closed at the sides and bottom and open at the top, said second channel extending along a second, linear axis;

f) said insert and said first channel being dimensioned for longitudinal sliding, retaining movement of said insert into said first channel through said at least one end; and g) a plurality of male snap fasteners fixedly attached in spaced relation to said cover, each of said fasteners having a lip dimensioned for movement into and out of said second channel by forcibly flexing portions of said second wall means away from said unflexed position, said lip being retained in said second channel by return of said portions to said unflexed position.

2. The invention according to claim 1 wherein said second wall means includes a pair of side wall members having inner surfaces spaced from one another to form said closed sides of said second channel, and outer surfaces spaced from one another by a distance less than the lateral distance between the portions of said first wall means forming said closed sides of said first channel, whereby said insert is laterally movable within said first channel.

3. The invention according to claim 2 wherein said insert includes flange means extending outwardly from said outer surfaces of said wall members, and said first channel includes recesses for receiving said flanges to maintain said insert in said first channel.

\* \* \* \* \*